No. 704,451. Patented July 8, 1902.
W. E. ELLIS.
FASTENER FOR SHOE UPPERS.
(Application filed Feb. 26, 1901.)
(No Model.)

WITNESSES:
Ellen F. Collins
William F. Macy

INVENTOR:
W. E. Ellis,
By E. D. Chadwick,
Attorney.

UNITED STATES PATENT OFFICE.

WARREN EUGENE ELLIS, OF HAVERHILL, MASSACHUSETTS.

FASTENER FOR SHOE-UPPERS.

SPECIFICATION forming part of Letters Patent No. 704,451, dated July 8, 1902.

Application filed February 26, 1901. Serial No. 48,943. (No model.)

*To all whom it may concern:*

Be it known that I, WARREN EUGENE ELLIS, a citizen of the United States, residing at Haverhill, in the county of Essex and State of Massachusetts, have invented certain new and useful Improvements in Fasteners for Shoe-Uppers, of which the following is a specification.

My invention relates to devices for temporarily securing together the eyeleted edges of the uppers of lace-shoes while they are being lasted.

In lasting shoes it is desirable not only that the tops of the upper shall be securely fastened together, but also that they shall conform accurately to the surface of the last; and my present invention is intended to provide a fastener for the purpose stated which while incapable of extension in the direction of the strain imposed upon it during the process of lasting shall nevertheless be self-conforming to the top of any last with which it may be used however sharp or obtuse its front edge or instep may be. To this end I construct my fastener of two members, one for each side of the upper, and hinge them together, so that they will be capable of turning with respect to each other on an axis coinciding substantially with the longitudinal opening between the eyeleted edges of the upper when my fastener is attached thereto, said edges being thereby made capable of assuming any angle with respect to each other while incapable of separation laterally under the tension of the lasting process, and I provide each of said members with means adapted to detachably engage and retain one or more eyelets in such manner as to prevent the fastener from being accidentally dislodged by the handling of the upper preparatory to lasting or by the turning movements of the members with respect to each other. My fastener in the preferred form herein described also provides for the securing together by one fastener and at one operation of two pairs of opposite eyelets, this being desirable in order to avoid putting an excessive strain on a single pair of eyelets.

Figure 1:
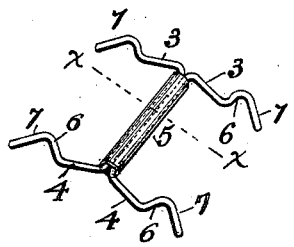
Figure 2:
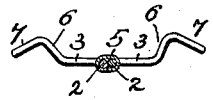
Figure 3:
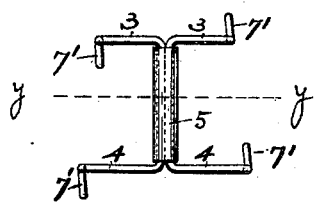
Figure 4:
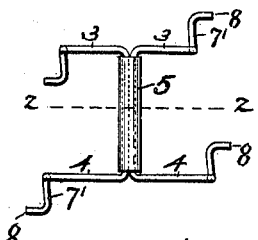
Figure 5:
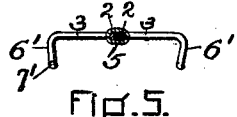
Figure 6:
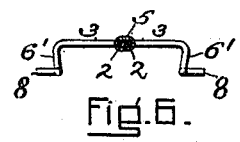
Figure 7:
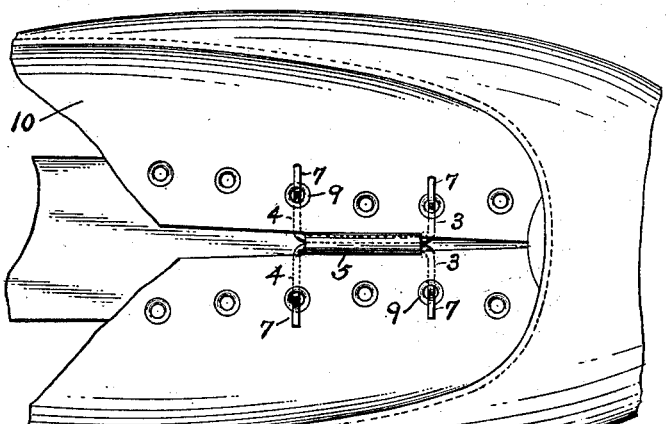

In the accompanying drawings, Figure 1 is a perspective view of a fastener embodying a preferred form of my invention, and Fig. 2 is a cross-section on the line $xx$ in Fig. 1. Figs. 3 and 4 are views similar to Fig. 1, showing modified forms of eyelet-retaining devices with which my fastener may be provided; and Figs. 5 and 6 are cross-sections taken, respectively, in the lines $y\,y$ and $z\,z$ in Figs. 3 and 4. Fig. 7 is a plan view of a portion of a shoe-upper with the fastener shown in Fig. 1 applied thereto ready for the lasting process.

The fastener shown in the drawings is composed of two similar eyelet-engaging members, preferably made of wire, each of which comprises a central portion 2 and end portions 3 and 4, extending substantially at right angles from said central portion and provided at or near their free ends with eyelet engaging and retaining means. The central portions 2 2 of said eyelet-engaging members are hinged together in any suitable manner, preferably by wrapping a metallic clip 5 around them, as shown. The end portions 3 and 4 may be provided with any desired eyelet engaging and retaining means which are effective for the required purpose, several forms thereof being shown in the drawings. For example, in the fastener shown in Figs. 1 and 2 the free end of each portion 3 and 4 is bent upward to form an eyelet-engaging shoulder 6 and then forward and downward, as shown at 7. As shown in Figs. 3 and 5, the ends of said portions 3 and 4 are first bent downward to form eyelet-engaging hooks 6' and then laterally in opposite directions, as shown at 7'. The fastener shown in Figs. 4 and 6 is like that shown in Figs. 3 and 5, except that the ends of the portions 7' are prolonged slightly and bent forward, as shown at 8. These various forms of eyelet engaging and retaining bends are not separately claimed herein, being described and claimed in Letters Patent of the United States No. 688,297, granted to me December 10, 1901, and in an application for Letters Patent of the United States filed by me May 31, 1899, Serial No. 718,811.

The fastener shown in Fig. 1 is attached to an upper in the manner illustrated in Fig. 7 by inserting its free ends through two pairs of opposite eyelets 9 from the inside of the upper 10, said eyelets being engaged by the shoulders 6 when the upper is under tension and being kept by the portions 7 from accidental displacement from said shoulders during the handling of the upper preparatory to lasting. When this form of eyelet-engaging means is used, the upper may be detached from the fastener without removing the last, as explained in my application, Serial No. 718,811, above referred to. The fasteners shown in Figs. 3 to 6, inclusive, are inserted from the outside of the upper, the eyelets 9 being received and engaged by the hooks 6' and retained thereon by the portions 7', as explained in Letters Patent No. 688,297, above referred to. In each case the hinge which connects the two members of the fastener lies longitudinally between the tops of the upper and along the front edge of the last and permits said members to lie flat against the sides of the last regardless of the shape of its front edge, thereby securing perfect conformity of the upper to the last during the process of lasting. It also permits the upper to be folded flat for convenience in handling and transportation after the fastener has been inserted and before the shoe is ready to be lasted.

I am aware that a belt-fastener has heretofore been patented in which two members are centrally hinged together, and I do not claim such a device. My invention relates, specifically, to devices for temporarily holding together the two sides of an upper while being lasted and necessarily includes as an essential element some means adapted to engage and detachably retain an eyelet in such manner as to prevent the device from being accidentally dislodged from the upper without interfering with its ready attachment and detachment when required, except to the extent just indicated.

I do not consider my invention to be limited to any particular form of eyelet engaging or retaining means, nor to any specific form of hinge, and my invention may readily be adapted to provide for securing together more or less than two pairs of eyelets at once, as will be evident.

I claim as my invention—

1. A detachable fastener for shoe-uppers comprising two members, each provided with eyelet engaging and retaining means, said members being hinged together midway between the free ends of the fastener, for the purpose set forth.

2. A detachable fastener for shoe-uppers comprising two members each of which consists of a central portion 2 and end portions 3 and 4, each of said end portions being provided with eyelet engaging and retaining means, and said central portions 2 being hinged together, for the purpose set forth.

3. A detachable fastener for shoe-uppers composed of two members each of which comprises a central portion 2 and end portions 3 and 4, each of said end portions being provided with eyelet engaging and retaining means, and a clip wrapped around said central portions 2, whereby said members are hinged together, substantially as described.

4. A detachable fastener for shoe-uppers comprising two members, the ends of which are each provided with an eyelet-engaging hook extended to form a short free end united thereto by an abrupt bend, said members being hinged together midway between said ends, for the purpose set forth.

5. A detachable fastener for shoe-uppers comprising two members, each of which consists of a central portion 2 and end portions 3 and 4, said central portions 2 being hinged together and each of said end portions being provided with an eyelet-engaging hook and extended beyond the same to form a short free end which is united to the corresponding hook by an abrupt bend, substantially as and for the purpose set forth.

WARREN EUGENE ELLIS.

Witnesses:
J. H. CONNOR,
E. D. CHADWICK.